June 3, 1952     S. F. GORSKE     2,598,993
TORQUE TRANSMITTING DEVICE
Filed July 31, 1948
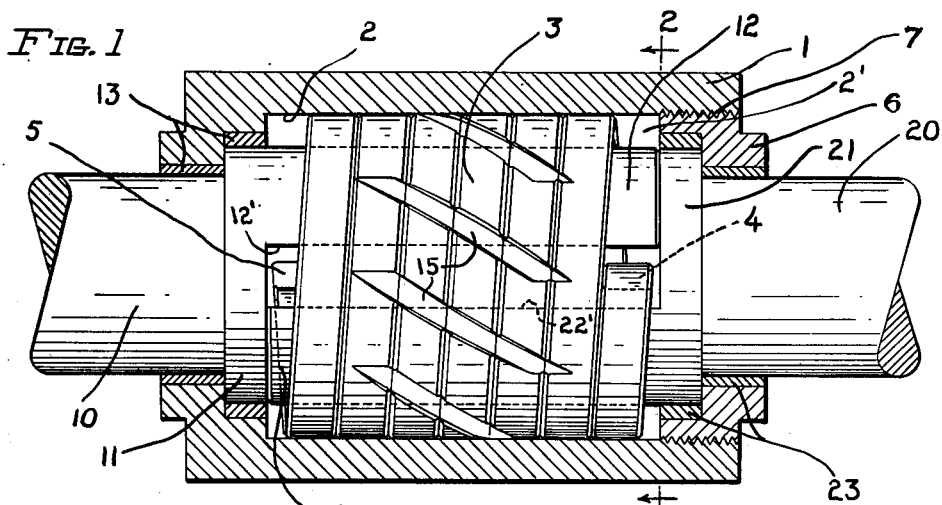
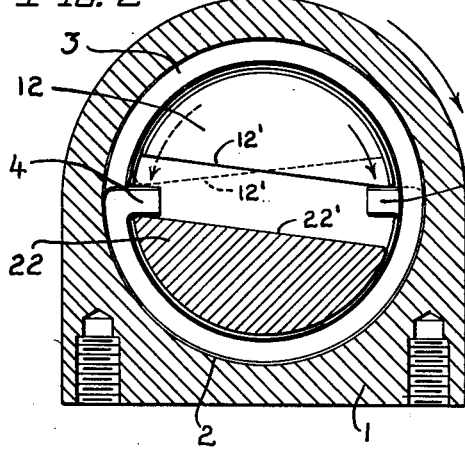
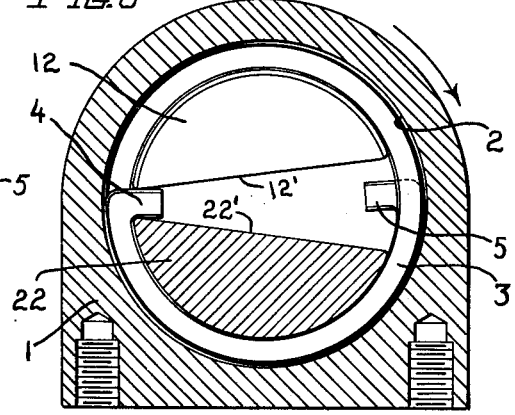
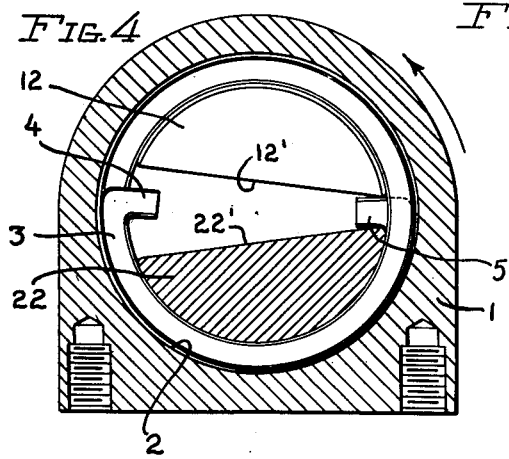
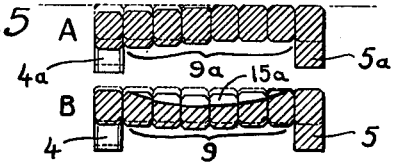
Stanley F. Gorske
INVENTOR.
BY
ATTORNEY

Patented June 3, 1952

2,598,993

UNITED STATES PATENT OFFICE 2,598,993

TORQUE TRANSMITTING DEVICE

Stanley F. Gorske, Indianapolis, Ind., assignor, by mesne assignments, to The Marquette Metal Products Company, Cleveland, Ohio, a corporation of Ohio Application July 31, 1948, Serial No. 41,742

5 Claims. (Cl. 192—8)

1

The invention relates to torque-transmitting devices and more particularly to a helical friction spring member employed therein for preventing or restricting relative rotation of the operative parts of the devices through frictional engagement with suitable drum surfaces formed on said operative parts.

The embodiment of the present invention illustrated herewith is a bi-directional brake wherein the friction spring member is normally in locking engagement with a drum surface, being deenergized by a force applied to either one of its ends to cause a diametral change in the coils of the spring thereby relieving it from its normal locking engagement with the drum surface. When a conventional spring is deenergized in this manner, its coils progressively change diameters from the coil at the end receiving the actuating deenergizing impulse or force toward the opposite end, the force applied to said first coil being transmitted with gradiently reduced, diameter-changing effect from coil to coil for the length of the spring until the torque imposed on the parts is balanced by the restraining friction/pressure of coils remaining in "overrunning" dragging contact with the drum surface, their residual torque being dissipated as heat thereby tending to cause undesirable wear of the engaging surfaces.

An object of the present invention is to provide a helical friction spring member of improved construction for use in the above described and analogous applications which construction materially reduces the heat generation and wear necessarily resulting from such overrunning drag, thereby to increase the life and efficiency of the device in which it is incorporated.

When a spring of conventional form (e. g. of uniform section throughout its length) is designed to be rendered effective by application of energizing torque selectively to its opposite ends to cause the spring to begin to grip its cooperating drum (the spring being assumed, when in relaxed condition, to be free from the drum) all the coils will tend to be moved simultaneously into gripping contact; and unless the energizing force is comparatively great or the spring and drum surfaces have a high instantaneous coefficient of friction, as by being free from lubricant, the spring may fail to grip under certain adverse conditions, as at high relative speed of the elements to be connected. Treatment of the end coils, as by making them more flexible than the intermediate coils and/or with less gripping or land surface per unit of length of coil, results in

2 greater certainty on part of the spring to grip the drum under such adverse conditions; but when the torque transmitting device is in operation the greatest radial pressure has to be at one end of the spring or the other, and such specially treated end coils are not as well adapted to withstand that pressure as without any such special treatment. The present spring by reason of having its intermediate coils more flexible and with reduced contact area per unit length of coil relative to the end coils is rendered more certain to perform instantaneous energization under adverse conditions at a region of the spring which is never called upon to serve as the maximum pressure portion of the spring.

Another object therefore is to provide a helical torque transmitting friction spring adapted for reversible friction locking operation against its cooperating drum, which spring is more sensitive and responsive to application of initial locking force than comparable springs of uniform stock section while being capable of withstanding concentrated high loading at either end.

Other objects will become apparent from the following description.

In the drawing, Fig. 1 is a central longitudinal sectional elevation of an illustrative form of transmitting device embodying the improved spring in one form; Figs. 2, 3 and 4 are transverse sections on the line 2—2 of Fig. 1 showing various operative positions of the parts of the device; Fig. 5 is a diagrammatic view showing an operation of a conventional spring, and Fig. 6 is a similar diagrammatic view illustrating the same operation on part of the improved spring hereof.

The two directional driving but anti-backdrive mechanism of Fig. 1 provides a suitable example wherein the advantages offered by the present invention can be illustrated. Therein the helical friction spring serves as an expanding-to-grip brake element. The invention is equally applicable to other and various forms of spring clutches and brakes, either of the expanding-to-grip or contracting-to-grip type, particularly those which are adapted to overrun or permit free relative rotation of parts in at least one direction of operation.

The device illustrated includes a housing or fixed member 1 secured to a suitable fixed frame or foundation by bolts or other means (not shown). Housing 1 has an axially extending central bore or pocket 2' defined principally by a brake drum surface 2 for frictional engagement by the outer peripheral surfaces of the several coils of a helical spring 3 located in the bore and generally complementary to the drum surface—being normally in interference fitting or preloaded relation thereto.

Driven shaft 10 extends from one end of housing 1 through a suitable opening therein, having a cylindrically formed enlarged portion 11 within the pocket 2' at one end thereof. Bearing sleeves 13 carried by housing 1 rotatably support shaft 10 and its enlargement 11 concentrically of the pocket 2'.

Driving shaft 20 which may, as shown, be approximately identical with the drive shaft 10, extends from the opposite end of housing 1, having an enlarged cylindrically formed concentric portion 21. The shaft 20 and said portion 21 may be rigidly supported for rotation concentrically of the drum 2 and the drive shaft on bearing sleeves 23 in a removable collar 6, tightly threaded into the housing 1 at 7 and forming an end wall for the housing. The enlargements 11 and 21 are extended inwardly from opposite ends in the form of semi-cylindrical shaft segments 12 and 22, the flat chordal faces 12' and 22' of which lie in spaced relation, side by side, a sufficient distance apart so that actuating lugs on respective end coils of the spring 3 (shown formed as toe portions 4 and 5 of the end coils) can both play freely between said faces 12' and 22' when the latter are, for example, in parallel relationship as shown in Fig. 2. The faces 12' and 22' are thus positioned for alternate contact with the lugs or toes 4 and 5 consequent upon a certain amount of relative angular movement of the shafts 10 and 20, the exact manner of contact depending upon which shaft is rotated from a given position of rest as will be explained.

All the coils of the spring 3 bear with substantially uniform radial pressure against the drum surface 2, being usually ground or formed cylindrically a few thousandths of an inch oversize with reference to the cylindrical drum surface. Sufficient clearance is provided between the inner peripheral surface of the spring and the exterior semi-cylindrical surfaces of segments 12 and 22 whereby the coils may contract for disengagement from the drum surface 2 and when so contracted will be supported against distortion or excessive contractual displacement. Only a slight diametral change is necessary for disengagement and engagement of the spring and drum surfaces.

The relationship of the respective members of the device when driving torque is transmitted in a clockwise direction, Figs. 2 and 3, is illustrated in the latter view. In that case, the flat chordal face 22' of segment 22 engages one radial face of toe 4 to exert a tangential force thereagainst, thus to drive the segment 12 and its shaft 10 clockwise. The tangential force when first applied to the toe 4 causes the coils of spring 3 to contract progressively with relation to the drum surface, right toward left Fig. 1, thus enabling the driven shaft or member 10 to be rotated by and with the driving shaft or member.

Should driven shaft 10 attempt to overrun or be caused to rotate at a higher speed than the driving shaft 20, the angular rotative motion causes the opposite (shown non-engaged) margin of the flat chordal face 12' to overtake the trailing toe 5, exerting a tangential pressure thereagainst and expanding the spring 3 into frictional engagement with drum surface 2. Meanwhile the face 22' releases its deenergizing pressure in the spring toe 4; the coils at the right hand end of the spring resume their normal strained or interference-fitting relationship to the drum, and the coils of the spring lock with increasing pressure from right toward left to block such clockwise overrunning movement of the driven member 10. Such blocking continues until the spring is released by driving torque exerted by the driving segment 22 against toe 4 at the opposite end of the spring for again contracting the coils. The above described locking condition is illustrated by the solid line portion of Fig. 2, it being assumed that face 22' of the drive shaft segment is about to be brought into contact with toe 4 but is not yet in spring-deenergizing contact therewith.

Should driving torque applied through driving shaft 20 fail at a time when a reverse torque load is being imposed on driven shaft 10 (counter-clockwise, Fig. 2) so that the driven shaft attempts to override the drive shaft in that direction, then the spring through engagement of face 12' with toe 4 expands and locks against the drum surface 2. Resumption of driving torque by shaft 20 in a clockwise direction releases the device, as previously described. Attempted counter-clockwise overriding motion on part of the shaft 10 is illustrated by the broken line showing of face 12' in Fig. 2, the dotted arrows showing the direction of attempted movement.

Torgue may be transmitted by the driving member 20 in a counter-clockwise direction, as illustrated in Fig. 4, wherein the shoulder face 22' of driving shaft 20 is working against the toe 5 to deenergize and contract the spring and, through the toe and segment 12, to turn the shaft 12 as previously described. The anti-back-drive operation in event of counter-clockwise overrun or overcoming torque on part of the driven shaft is, obviously, the same as during the clockwise action described.

If we were to assume that the helical friction spring 3 is of uniform section stock throughout its length (common practice, as illustrated by Fig. 5) then, when the spring is pulled around in the drum 2 (overrunning drag action) by tangential force applied to the spring as on the toe 5 in Fig. 4, the coils beginning with that end to which the pulling force is applied (left, Fig. 1), are contracted progressively decreasing amounts toward the trailing end of the spring until the overrunning holding friction of the remaining coils is overcome and the spring slips in its drum. Only a few coils are thus contracted completely out of contact with the drum, the number of coils or length of coil so contracted depending upon the stiffness of the spring stock and the amount of preloading or interference fit of the spring in the drum. As the others slip or drag against the drum the idly-expended energy resulting from such dragging is dissipated as heat. If there is lubricant associated with the spring (e. g. contained in the spring pocket) such is squeezed out from between the spring and drum contacting surfaces either before or during application of load; hence, assuming lubricant, at least the initial slippage of coils on the drum is through metal-to-metal contact. Thus the heating and resulting wear can easily reach destructive values. Each coil during overrunning drag can exert only a maximum outward force, and therefore the more coils that can be pulled out of their preloaded pressure contact the less will be the destructive effect, e. g. wear or galling, on the spring and drum. The present spring, by reason of having a number of coils intermediate the end coils more flexible than the end coils and with less unit gripping area, operates to remove a greater number of coils and of working coil area from overrunning dragging contact with the drum.

It would appear on casual observation that the same result could be accomplished in the illustrated anti-back-drive mechanism by having only the endmost coils of the spring 3 preloaded against or in interference-fitting relation to the drum 2, the intermediate coils being of smaller diameter. Such a spring would not only be relatively expensive to form and finish but, in operation, each time the coils were expanded into locking contact with the drum one of such preloaded end coils, then under higher load, would have to slip in order to enable the smaller diameter intermediate coils to go into locking contact with the drum.

The illustrated treatment of the spring 3 in accordance with the present invention to render the intermediate coils more flexible than the end coils is to slot the coils as at 15, Fig. 1, intermediately of the two ends of the spring. As a result of the preferred manner of forming the slots 15 the same decrease gradually in depth from the deepest portion in opposite directions axially of the spring. The oblique slots 15 are formed by mounting the spring 3 obliquely with reference to the path of movement of a cutting tool (e. g. grinding wheel), or with reference to the path of movement of the spring if the spring mounting is the moving part, so that the slots are cut on each working stroke between indexings of the spring to present new surfaces to the cutter. In that manner the tool runs out naturally at the end of each slot, and one slot is formed at each stroke in each direction of relative reciprocating movement between the spring and cutting tool. No retraction, as of the tool radially of the spring, is necessary at the end of each cut, and there are no idle strokes. Were the slots to be cut axially of the spring or nearly so (as might be done within the intended scope of the invention), then in order to leave unslotted coils at both ends of the spring such radial retraction would be unavoidable. The oblique slots 15 have a further advantage in that they facilitate grinding of the spring to true cylindrical form. The slots 15 from the standpoint of operation in relieving or minimizing overrunning drag could, of course, be cut axially of the spring.

Incidentally, the provision of the slots symmetrically in respect to the two ends of the spring is illustrative only, and is because the particular embodiment shown operates bi-directionally. In a one-way overrunning spring clutch, for example, it would usually be advantageous to have the slots, as a whole, located nearer one end of the spring than the other, i. e. toward the end of the spring which remains in dragging contact during overrun.

The slotting of the coils, as at 15, intermediate the end coils of the spring, in addition to making those intermediate coils more flexible than the end coils, also reduced the unit area per coil in contact with the drum. That obviously is true only when the slots are in the acting (braking or clutching) surface, for example as shown. The slotting tends to minimize overrunning drag in a given design of spring since the total friction is proportional to the area of friction surface at a given pressure and coefficient of friction. The slots may have flared or radially diverging side walls to increase their drag-surface-diminishing effect. The bottom of each slot 15 is planar from end to end (not shown) when the slots are formed as described above. The number of slots per spring and their depth and width are selected in accordance with expected service conditions, loads and speeds involved, etc.

When a tangential force is applied to one end of the improved spring in the direction to contract or deenergize the spring, the coils from that end do not tend to wind down successively decreasing amounts as would be the case in a conventional spring. The intermediate coils, being much more flexible than the end coils, have a heightened reactance to the tangential or circumferential deenergizing force transmitted to them and consequently withdraw or are pulled down completely from engagement with the drum surface, leaving only the heavier end coils in frictional engagement therewith at the time slippage occurs. The heavier coils at the end receiving the initial deenergizing impulse perform a somewhat greater diametral change than the equally heavy section coils at the opposite end, hence substantially only those latter coils generate frictional heat during slippage. The amount of heat is nearly proportional to the coil surfaces remaining engaged at the selected preloading value of the spring in its drum or pocket.

The action of a conventional spring as compared to that of an improved spring according to the present invention is illustrated diagrammatically in Fig. 5, wherein A is such conventional spring having uniformly flexible coils from end to end. B, in Fig. 6, represents the improved spring with relatively flexible coils intermediate the end coils. The slots 15a in Fig. 6 are assumed to extend axially of the spring, not obliquely as in Fig. 1 although the action would be the same in either event. The dotted lines indicate the engaged or energized positions of the coils, while the solid lines indicate the deenergized positions when the same tangential force is applied to toes 4 and 4a of respective springs. The degree of contraction of the coils is, of course, greatly exaggerated, the true movement being too minute to depict accurately. The differences in reaction of the central or intermediate coils 9 and 9a of the respective springs is quite apparent.

In addition to the above advantages, the improved spring will react more speedily to an energizing or deenergizing impulse, since its more flexible central coils will respond more rapidly to diametral change. This characteristic of the improved spring is of particular value in applications such that immediate and positive lock-up and release are critical to the proper functioning of the device and whenever the spring is energized into contact with its drum or drums by other than inherent spring force (non-self-energizing). However the improved spring may be employed with equal advantage in any friction coil spring device where overrunning drag and resultant heat generation and wear present similar problems and/or where instantaneous releasing and locking up actions are important. Examples of applicable equipment are power wrenches, hoists and earth-handling power machinery.

In a one-way-overrunning spring clutch the slotting treatment, as a whole, would ordinarily be closer to the end coil opposite that to which the deenergizing torque is applied during overrun whereby to cause withdrawal of an increased number of coils out of contact as compared to the action obtained by a spring which is symmetrical endwise. Also the slots can become deeper or the number of slots per coil increased toward the unslotted end coil or coils opposite that end of the spring to which the deenergizing torque is applied, whereby in effect to offset the natural tendency of uniform cross section coils decreasingly to move radially out of contact with the drum away from the deenergizing end.

I claim:

1. An operatively integral, helical, torque transmitting friction spring designed for peripheral friction contact with an internal drum surface, said spring having on its external peripheral surface a series of obliquely extending slots, each of gradiently decreasing depth toward its opposite ends, the slots intersecting only external coil surfaces which lie intermediately of the ends of the spring.

2. The spring according to claim 1 wherein the slots have planar bottom walls and the associated side walls are of decreasing radial height toward the opposite ends of the slots.

3. An operatively integral helical coil friction spring member embodying a plurality of approximately uniform diameter helical coils adapted to change diameters in response to an actuating coiling force received by an end coil thereof, coils of said spring member intermediate the end coils being of effectively reduced cross section and thereby relatively flexible as compared to both end coils, whereby said intermediate coils will undergo a greater diametral change than the coil at the end opposite the coil receiving the actuating force.

4. In combination with a circular drum surface, an operatively integral helical coil friction spring member embodying a plurality of helical coils in preloaded frictional engagement with the drum surface and adapted to retract therefrom in response to a deenergizing coiling force received by an end coil thereof, the intermediate coil of said spring having more unit flexibility than the end coils thereof, whereby the more flexible central coils will change diameters in the retracting direction to a greater degree than would be the case were all the coils of the same unit flexibility.

5. An anti-back-driving, bi-directional torque transmitting mechanism comprising a driving member and a coaxial driven member, both rotatably carried in a fixed housing having a drum surface, an operatively integral helical friction spring member normally frictionally engaged at its ends with the driving and driven members for energizing operation of the coils and overrunning operation thereof relative to the drum surface, the intermediate coils of said friction spring being more flexible than the end coils thereof, whereby when either end of said spring is actuated to produce an overrunning operation of the spring the intermediate coils will undergo a greater diametral change than will a coil or coils at that end.

STANLEY F. GORSKE.

REFERENCES CITED

The following references are of record in the file of this patent:

UNITED STATES PATENTS

| Number | Name | Date |
|---|---|---|
| Re. 16,565 | Myers | Mar. 1, 1927 |
| 182,924 | Hansell | Oct. 3, 1876 |
| 787,788 | Pinard | Apr. 18, 1905 |
| 1,609,300 | Nicholson | Dec. 7, 1926 |
| 1,935,147 | Drexler | Nov. 14, 1933 |
| 1,952,415 | Brownlee | Mar. 27, 1934 |
| 1,953,370 | Starkey | Apr. 3, 1934 |
| 2,038,063 | Starkey | Apr. 21, 1936 |
| 2,043,695 | Brownlee | June 9, 1936 |
| 2,055,068 | Drexler | Sept. 22, 1936 |
| 2,219,877 | Starkey | Oct. 29, 1940 |
| 2,421,814 | Starkey | June 10, 1947 |
| 2,458,441 | Starkey | Jan. 4, 1949 |

FOREIGN PATENTS

| Number | Country | Date |
|---|---|---|
| 508,271 | France | Oct. 6, 1920 |